United States Patent [19]

Roe

[11] Patent Number: 4,897,218
[45] Date of Patent: * Jan. 30, 1990

[54] METHODS FOR SUPPRESSING CEMENT CLINKER DUST EMISSIONS

[75] Inventor: Donald C. Roe, Southampton, Pa.

[73] Assignee: Betz Laboratories, Inc., Trevose, Pa.

[*] Notice: The portion of the term of this patent subsequent to Oct. 25, 2005 has been disclaimed.

[21] Appl. No.: 41,902

[22] Filed: Apr. 24, 1987

[51] Int. Cl.⁴ ............................ C04B 7/48; C09K 3/22
[52] U.S. Cl. .................................. 252/313.1; 252/88; 252/307; 252/382; 106/102
[58] Field of Search ....................... 252/307, 313.1, 88, 252/382; 106/102

[56] References Cited

U.S. PATENT DOCUMENTS

| | | |
|---|---|---|
| 943,667 | 12/1909 | Ellis . |
| 2,605,236 | 7/1952 | McCants ............................. 252/88 |
| 2,621,115 | 5/1953 | Van Order . |
| 2,646,361 | 7/1953 | Rostler . |
| 2,854,347 | 9/1958 | Booth et al. . |
| 3,186,943 | 6/1965 | Bartnauer . |
| 3,388,990 | 6/1968 | Maruta et al. ....................... 252/382 |
| 3,811,660 | 5/1974 | Cole, Jr. . |
| 3,937,283 | 2/1976 | Blauer et al. . |
| 3,954,662 | 5/1976 | Salyer et al. ......................... 252/382 |
| 3,980,136 | 9/1976 | Plummer et al. . |
| 4,000,992 | 1/1977 | Cole, Jr. . |
| 4,038,443 | 7/1977 | Jacoby ............................. 252/88 X |
| 4,067,818 | 1/1978 | Marin . |
| 4,087,572 | 2/1978 | Nimerick . |
| 4,136,050 | 1/1979 | Brehm . |
| 4,169,170 | 9/1979 | Doeksen . |
| 4,171,276 | 10/1979 | Brehm . |
| 4,200,413 | 4/1980 | Fitch . |
| 4,301,119 | 11/1981 | Cobbs et al. . |
| 4,369,121 | 1/1983 | Callahan et al. ..................... 252/88 |
| 4,380,459 | 4/1983 | Netting . |
| 4,400,220 | 8/1983 | Cole, Jr. . |
| 4,417,992 | 11/1983 | Bhattacharyya . |
| 4,425,252 | 1/1984 | Cargle et al. ......................... 252/88 |
| 4,551,261 | 10/1985 | Salihar . |
| 4,561,905 | 12/1985 | Kittle . |
| 4,571,116 | 2/1986 | Patil et al. . |
| 4,605,568 | 8/1986 | Kober ............................. 252/384 X |
| 4,650,598 | 3/1987 | Roberts et al. ....................... 252/88 |
| 4,780,143 | 10/1988 | Roe ................................. 252/88 X |
| 4,780,233 | 10/1988 | Roe ................................. 252/312 X |

FOREIGN PATENT DOCUMENTS

| | | |
|---|---|---|
| 0144734 | 11/1981 | Japan . |
| 566788 | 7/1977 | U.S.S.R. . |
| 0763437 | 9/1980 | U.S.S.R. . |
| 602406 | 5/1948 | United Kingdom . |

OTHER PUBLICATIONS

"Foam Suppression of Respirable Coal Dust", Final Report, Dec. 1970, Salyer et al.
"Petroleum Based DCA's to Control Fugitive Dust", Proceedings of the Annual Meeting of the Fertilizer Industry-Roundtable 1977, Series 27, pp. 94–96.
*Agricultural Engineering*, Sept. 1985, pp. 9–12.

Primary Examiner—John F. Terapane
Assistant Examiner—Gary Geist
Attorney, Agent, or Firm—Alexander D. Ricci; Steven D. Boyd

[57] ABSTRACT

A method of suppressing dust generation emanating from cement clinker by applying a foamed water/surfactant solution thereto. The solution comprises a low salt tolerant anionic surfactant.

20 Claims, No Drawings

METHODS FOR SUPPRESSING CEMENT CLINKER DUST EMISSIONS

FIELD OF THE INVENTION

The present invention pertains to methods for applying an effective dust control agent onto cement clinker after same has been calcined.

BACKGROUND OF THE INVENTION

Portland cement is commonly used in cement and concrete mixtures for a variety of commercial and individual purposes such as for building structures, roads and highways, bridges, concrete pipe and in the formation of myriad precast construction components. Presently, many different types of Portland cement are produced in the United States with specifications for each being dictated by the intended end use.

The raw materials involved include limestone, clay, shale, iron containing materials and siliceous materials. These materials are normally obtained by drilling and blasting techniques with the raw materials then being transported from the quarry to crusher and screening operations.

The crushed and/or screened materials are then further processed to obtain "Portland cement clinker" which clinker consists essentially of hydraulic calcium silicates. Portland cement is formed by adding gypsum and then pulverizing the mixture by means of a ball mill or the like. It is then either packaged or stored. The end user then adds water, aggregate, sand, etc. to the dry ground clinker-gypsum mixture to form the desired mortar or concrete (end product).

The raw materials obtained from the quarry are usually subjected to either a "dry" or "wet" process prior to calcination. For example, in the "dry process", the raw materials are dried and ground. The ground particles are then separated by size, with overly large particles being re-ground. The products are then blended and stored prior to calcination. In the "wet process", the raw materials are slurried and then ground in slurry state prior to calcination.

In the calcination step, the blended material, from either the "dry" or "wet" process, is fed to an elongated rotating kiln operating at temperatures up to about 2700° F. The product exits the kiln at temperatures from about 1800° F. to 2700° F. and is referred to as cement clinker. The clinker is then cooled via air draft circulation or similar means, stored, then normally blended with gypsum and sent to a rotary grinding or finishing mill. The product is then stored prior to packaging and bulk transport by rail, barge or truck.

Although the problem of fugitive dust emission may be present at various points through the Portland cement process, it is especially troublesome when the hot clinker (e.g., 150° to 400° F.) is transferred after the clinker cooler to a conveyor upstream from the finishing mill step or as the cooling clinker is transferred to a storage pile.

In order to minimize the emission of fugitive dust emanating from the raw materials or from the clinker, numerous approaches have been tried. Typically, process transfer points may be hooded or covered. Attempts at wet dust suppression have been generally ineffective. Clinker may actually prematurely "set-up" or cake, adversely affecting the commercial value and performance of the final cement product.

Experiments have been undertaken with the use of foamed dust control treatments. Despite the superior dust control efficacy of foamed treatments, the foam results in an increase in entrained air in the resulting cement products. This factor has severely curtailed use of foams since the increased air entrapment causes undesirable variation from the air entrapment specifications for particular Portland cement grades. More importantly, undesirable increases in the air entrapped within the product may lead to product compressive strength reduction that could cause structural failure of the cement.

These and other problems in the art of cement clinker dust control are addressed by the present invention.

SUMMARY OF THE INVENTION

In accordance with the invention, a foamed dust control additive treatment is applied to the clinker after it exits from the clinker cooler. Later, when the clinker and other ingredients (e.g., sand, aggregate, gypsum) are slurried to form the desired mortar, foam formation is then inhibited or retarded in such a manner as to not result in a significant increase in the air entrapped in the final cement product.

In accordance with the invention, a foam treatment comprising a surfactant or surfactants having a very low salt (e.g., calcium) tolerance is applied to the cement clinker. By low salt tolerance, I mean that the surfactant used to produce the dust control foam will lose its surface active properties by reaction with inorganic salts when brought into contact with the mortar mix. As a result, the surfactant will have little or no effect on the air content of the final product. An acceptable formulation including a low salt tolerant surfactant will not increase air entrapment values by more than about 20% when applied to the clinker in an amount necessary to suppress cement clinker dust emissions by about 70-100%, when air content of the mortar is determined according to ASTM C185 specifications. When low salt tolerant surfactants are used, the water used to form the dust control foam should be relatively low in hardness (0 to 250 ppm as $CaCO_3$) and other dissolved salts so that the low salt tolerant surfactant will be able to provide its intended function in helping to build the foam. Conversely, when the mortar is prepared, a high hardness (1000 to 5000 ppm as $CaCO_3$) water is encountered in the aqueous phase of the slurry due to dissociation of free lime (CaO), gypsum ($CaSO_4$) and other species; thus, foam formation is inhibited or retarded at the mortar preparation stage. Accordingly, the air entrapped in the final concrete product is not significantly increased. An empirical definition of acceptable low salt tolerant foaming agents is provided in the discussion of the experimental data.

By use of the phrase "not significantly increased", I mean to state that, as measured by ASTM No. C185, the % air entrainment of the mortar resulting from a foam treated clinker does not increase by greater than about 20% when compared to untreated clinker mortar.

PRIOR ART

Of primary interest is U.S. Pat. No. 4,561,905 (Kittle). This patent is specifically directed toward methods for suppressing coal dust dissemination by application of a foamed water-diluted emulsion of water, a surfactant, and an oil which exhibits a tacky characteristic on the coal dust.

Of further interest is U.S. Pat. No. 4,551,261 (Salihar) which discloses that the generation of dust by coal and other solid particulate materials may be suppressed by the application of a foam comprising water, a foaming agent, and elastomeric water insoluble polymer. The foaming agent may be selected from a variety of anionic and nonionic surfactants and combinations thereof. This -261 patent is devoid of any suggestion as to utilization on cement clinker dusts. Further, this prior art patent is devoid of any suggestion whatsoever as to the step of collapsing or killing the foam as is herein required so as to not significantly increase the amount of air entrapped in the final cementitious product.

Of possible interest is U.S. Pat. No. 4,400,220 (Cole) which is directed toward the prevention of dust dissemination with coal or other dusty products. The -220 Cole patent is directed toward the use of foamed air/water/surfactant foams which are to be applied to the coal at various conveyor and transfer points in the coal handling process. As mentioned previously, however, traditional foaming agents (surfactants) which are formulated to withstand high hardness waters (e.g., plant and process waters) significantly increase air entrainment values.

DETAILED DESCRIPTION OF THE INVENTION

I have found that a water/surfactant foam may be applied to cement clinker dust to thereby inhibit dust emanation therefrom without significantly increasing the air entrapment level of the resulting finished cementitious product.

In accordance with the invention, a low salt tolerant surfactant is foamed with water and sprayed over the cement clinker after calcination. It is important that the water with which the low salt tolerant surfactant is foamed be of relatively low (i.e., 0 to 250 ppm) hardness. In this manner, due to the use of low hardness foam makeup water, the water/surfactant foam foams sufficiently (10 to 100 expansion) to provide good dust control efficacy. However, when the product is to be ultimately used, inorganic salts in the Portland cement clinker and the mortar mix water react with the low salt tolerant surfactant and inhibits foam formation at that time. Accordingly, upon mixing of the mortar, no substantial increase (in comparison with untreated samples) of air entrapment in the formed cement product is found.

As an example of a low salt tolerant surfactant, Biosoft D series surfactants, available from Stepan, may be mentioned. The surfactants are sodium dodecylbenzene sulfonates and are generally classified as anionic detergents.

Other anionic low salt tolerant surfactants which can be mentioned include: sodium lauryl sulfates, sodium alpha olefin sulfonates and sodium salts of fatty acids.

To improve the foaming characteristics of the low salt tolerant surfactants, foam stabilizing additives can be incorporated which, in and of themselves, do not have good foaming properties, but, when blended with a foaming agent, can increase foam volume and stability. In that way, improved foam is available for dust control purposes, but, in the absence of low salt tolerant surfactants (e.g., in the cement mortar where the aforementioned surfactants are precipitated with calcium), no appreciable amount of foaming (air entrainment) will occur. Exemplary foam stabilizing additives include:

Amine oxides (e.g., lauramine oxide, myristamine oxide, etc.)
Aklanolamides (e.g., lauramide DEA, myristamide MEA, etc.)
Natural and synthetic polymers (e.g., celluloses, gums, acrylamide copolymers, etc.)

A contemplated, preferred foam stabilizing additive is an alkanolamide such as "Witcamide 82" manufactured by Witco Chemical Corporation, Organics Division.

The water/low calcium tolerant surfactant foam for the clinker dust control treatment may be formed and applied via conventional techniques such as those disclosed in U.S. Pat. No. 4,400,220 (Cole), the contents of which are hereby incorporated by reference.

The water/low salt tolerant surfactant formulation is normally supplied in one drum in the form of an aqueous solution. The desired foaming device is connected to the solution tank at the site and the foamed surfactant solution sprayed over the hot clinker after same has been cooled or is in the process of cooling. Acceptable water/low calcium tolerant emulsions formulations are:

| water | 50–90% (wt) |
|---|---|
| low salt tolerant anionic surfactants | 10–50% (wt) |

The preferred low calcium tolerant water/surfactant solutions are:

| BioSoft "D" series Stepan Chemical sodium dodecylbenzene sulfonate | 15–23 wt % |
|---|---|
| Bioterge AS-40 surfactant Stepan Chemical sodium $C_{14}$–$C_{16}$ olefin sulfonate | 2–5 wt % |
| Water | Remainder |

It is to be noted that the preferred low calcium tolerant water/surfactant solution has been sold by the assignee of the invention, BETZ LABORATORIES, INC., for years. However, my understanding is that I have been the first to utilize this particular solution to control dust dissemination from hot cement clinker.

The low salt tolerant surfactant/water solutions are diluted with water at the job site, foamed, and sprayed as a foam, onto the hot clinker. The dilution ratio (i.e., the ratio of quantity of added water to the quantity of aqueous solution) may be on the order of 99:1 to about 95:5. Foam may be formed within the expansion ratio of about 10:1 to 100:1 (volume of foam:volume of the diluted aqueous solution). Desirably from about 0.025 gal/ton to 0.100 gal/ton of the aqueous solution (as measured in the non-diluted aqueous solution form) is foamed onto the clinker.

The low salt tolerant surfactant/water solutions should be diluted with relatively pure or demineralized water to form the desired foam. At this portion of the process, use of high hardness water (e.g., greater than around 250 ppm) would cause the low salt tolerant surfactant to precipitate, thus inhibiting foam formation which foam is needed at this step to provide effective dust control without caking or pluggage.

Conversely, after foamed dust control treated clinker has been ground and incorporated into a cement product and a cement mortar is prepared, the hardness in the cement and the mortar makeup water will react with the low salt tolerant surfactant remaining on the clinker, inhibiting foam generation and air entrapment in the freshly prepared cement-mortar slurry.

EXAMPLES

I. Method for Applying Foaming Agents in the Laboratory

In order to determine the effects of various products and formulations on the air entrainment value of cement mortar, treatments were incorporated into the water used to prepare the mortar mix. Aside from the inclusion of chemical treatments, the mortar was prepared in the usual way (ASTM C305) as specified in the procedure for determining the air content of hydraulic cement mortars (ASTM C185).

II. Method for Measuring the Air Content of Hydraulic Cement Mortars

Air content measurements were made according to ASTM C185 specifications in a certified cement testing laboratory. Where treatments were applied to the clinker (in the field), the clinker was then ground with gypsum in a finishing mill to produce Portland I/II cement. Where treatments were incorporated into the water used to make cement mortar (in the laboratory), a standard bag of Portland I/II cement was used as cement.

The ASTM standard method for measuring air content consists of preparing a batch of standard mortar (350 g of cement, 1400 g of standard sand and sufficient water to give a flow of 87.5±7.5% in accordance with Section 5.3 of ASTM C185) which is mixed in accordance with ASTM C305. The mortar is then placed in a 400 mL cylindrical measure and weighed. Given the specific gravity of the cement and standard sand, and knowing the amount of water used to prepare the mortar, the % air in the mortar mix is calculated.

III. Laboratory Foam Studies

The laboratory foam studies were conducted by adding 10 mL of solution (treatment(s)+deionized water or deionized water containing 1000 ppm $Ca^{++}$ from $CaCl_2$) into a 100 mL, stoppered graduated cylinder. The cylinder was then shaken vigorously for 30 seconds, and the volume of foam produced was recorded.

Results are reported in Tables I to IV.

TABLE I

| | | Field Test Results for Clinker Dust Suppression (Western Location) | | | | | |
|---|---|---|---|---|---|---|---|
| Test No. | Product | Product Feedrate (Gal/Ton) | Total Solution Feedrate (Gal/Ton) | Back Pres. psig | Dust Suppression, % | % Air | Comments |
| 1 | AA | 0.020 | 0.82 | 5-7 | 0 | — | Foam application to screw conveyor |
|   | AB | 0.091 |     |     |   |   |   |
| 2 | AA | 0.020 | 1.91 | 7-10 | 0 | — | Conveyor pluggage |
|   | AB | 0.091 |     |     |   |   |   |
| 3 | AA | 0.020 | 2.73 | 12-15 | 75 | — | Foam application to drag chain |
|   | AB | 0.091 |     |     |   |   |   |
| 4 | AA | 0.064 | 3.82 | 18-20 | 100 | 17.6 | To drag chain |
|   | AB | 0.136 |     |     |   |   |   |
| 5 | AA | 0.048 | 3.82 | 18-20 | 90 | 17.6 | To drag chain |
| 6 | AA | 0.021 | 3.82 | 15-18 | 90 | 16.5 | To drag chain |
| 7 | AA | 0.014 | 2.73 | 6-8 | 50 | 13.1 | To drag chain |
| 8 | AC | 0.024 | 4.10 | 15-18 | 50 | 11.2 | Spray application to drag chain |
| 9 | AC | 0.048 | 4.10 | 15-18 | 50 | 11.1 | Drag chain pluggage |
| 10 | AA | 0.020 | 4.10 | 15-18 | 85 | 11.4 | Foam application to drag chain |
|    | AF | 0.024 |     |     |   |   |   |
| 11 | AA | 0.020 | 4.10 | 15-18 | 85 | 9.3 | Foam application to drag chain |
|    | AF | 0.048 |     |     |   |   |   |
| 12 | AA | 0.024 | 2.73 | 15-18 | 100 | 8.4* 8.3 8.3 7.8 | Foam application to drag chain |
|    | AF | 0.095 |     |     |   |   |   |
| 13 | AA | 0.024 | 3.82 | 15-18 | 100 | 13.6* 12.8 | Foam application to drag chain |
|    | AF | 0.024 |     |     |   |   |   |
| 14 | AA | 0.042 | 3.82 | 15-18 | 100 | 8.3* 8.1 8.4 7.8 | Foam application to drag chain |
|    | AF | 0.085 |     |     |   |   |   |
| 15 | AD | 0.024 | 3.82 | 15-18 | 100 | 7.4* 9.8 11.4 | Foam application to drag chain |
| 16 | AD | 0.024 | 2.73 | 15—18 | Poor - Problems with all | | |
| 17 | AD | 0.050 | 4.37 | 15-18 | 100 | 11.5 | To drag chain |
|    | AF | 0.012 |     |     |   |   |   |
| 18 | AD | 0.048 | 4.37 | 15-18 | 100 | 8.8* 8.7 9.8 8.1 8.7 | To drag chain |
|    | AF | 0.024 |     |     |   |   |   |

TABLE I-continued

Field Test Results for Clinker Dust Suppression (Western Location)

| Test No. | Product | Product Feedrate (Gal/Ton) | Total Solution Feedrate (Gal/Ton) | Back Pres. psig | Dust Suppression, % | % Air | Comments |
|---|---|---|---|---|---|---|---|
| | | | | | | 9.1 | |

*Multiple tests for % Air run hourly.

TABLE II

Lab Tests Conducted at Western Cement Manufacturer's Location

| Test # | Product | Solution, % | mLs/350 gm | Gallon/Ton | % Air |
|---|---|---|---|---|---|
| Control | — | — | — | — | 8.2 |
| A | AA | 1.0 | 11.0 | 0.072 | 21.3 |
| B | AA | 1.0 | 4.6 | 0.032 | 14.7 |
| C | AD | 1.0 | 11.0 | 0.072 | 16.7 |
| D | AD | 1.0 | 4.6 | 0.032 | 14.8 |
| E | AE | 1.0 | 4.6 | 0.032 | 15.4 |
| F | AA | 1.0 | 4.6 | 0.032 | 12.2 |
| | AF | 100* | 0.14 | 0.100 | |
| G | AE | 1.0 | 1.4 | 0.010 | 18.6 |
| | AA | 1.0 | 4.6 | 0.032 | |
| H | AE | 1.0 | 1.4 | 0.010 | 13.7 |
| | AD | 1.0 | 4.6 | 0.032 | |

*Product AF, being a hydrocarbon, was not water soluble

TABLE III

Western Location Manufacturer's Cement Lab Test Results

| Test No. | Product | Solution Conc (%) | Feedrate mLs/350 g | Feedrate Gal/Ton | % Air | Comments |
|---|---|---|---|---|---|---|
| 1 | None | — | — | — | 8.1 | Unknown cement sample used to demonstrate test |
| 2 | None | — | — | — | 8.9 | Same bag of Portland I/II cement used for this and all subsequent testing |
| 3 | None | — | — | — | 9.1 | |
| 4 | None | — | — | — | 8.6 | |
| 5 | AA | 1.0 | 7.0 | 0.048 | — | Invalid - Flow = 99+% |
| 6 | AA | 1.0 | 7.0 | 0.048 | 15.2 | |
| 7 | AD | 1.0 | 7.0 | 0.048 | — | Invalid - Flow = 96% |
| 8 | AK | 1.0 | 7.0 | 0.048 | 13.7 | |
| 9 | AS | 1.0 | 7.0 | 0.048 | 12.8 | |
| 10 | AD | 1.0 | 7.0 | 0.048 | 14.6 | |
| 11 | None | — | — | — | 9.3 | |
| 12 | AA | 1.0 | 7.0 | 0.048 | 15.1 | |
| 13 | AA | 1.0 | 7.0 | 0.048 | 12.3 | |
| | AF | 1.0 | | 0.048 | | |
| 14 | AA | 1.0 | 7.0 | 0.048 | 15.3 | |
| | AH | 1.0 | | 0.048 | | |
| 15 | AA | 1.0 | 7.0 | 0.048 | — | Invalid - Flow = 97% Caustic added to AR |
| | AR | 1.0 | | 0.048 | | |
| 16 | AA | 1.0 | 7.0 | 0.048 | 15.8 | Caustic added to AR |
| | AR | 1.0 | | 0.048 | | |
| 17 | AA | 1.0 | 7.0 | 0.048 | — | Invalid - Flow = 100+% |
| | AI | 1.0 | | 0.048 | | |
| 18 | AA | 1.0 | 7.0 | 0.048 | 16.0 | |
| | AI | 1.0 | | 0.048 | | |
| 19 | AA | 1.0 | 7.0 | 0.048 | 11.2 | |
| | AJ | 1.0 | | 0.048 | | |
| 20 | AA | 1.0 | 7.0 | 0.048 | 15.2 | |
| | AR | 1.0 | | 0.048 | | |
| 21 | AA | 1.0 | 7.0 | 0.048 | 12.2 | |
| | AN | 1.0 | | 0.048 | | |
| 22 | AA | 1.0 | 7.0 | 0.048 | 14.7 | |
| | AM | 1.0 | | 0.048 | | |
| 23 | AA | 1.0 | 7.0 | 0.048 | 15.0 | |
| | AG | 1.0 | | 0.048 | | |
| 24 | None | — | — | — | 8.4 | |
| 25 | AA | 1.0 | 7.0 | 0.048 | 15.2 | |
| 26 | AA | 1.0 | 7.0 | 0.048 | 11.4 | Sample prepared the previous day |
| | AF | 1.0 | | 0.048 | | |
| 27 | AA | 1.0 | 7.0 | 0.048 | 13.9 | |
| | AP | 1.0 | | 0.048 | | |
| 28 | AA | 1.0 | 7.0 | 0.048 | — | Invalid - Flow = 96% |
| | AQ | 1.0 | | 0.048 | | |
| 29 | AA | 1.0 | 7.0 | 0.048 | 14.1 | |
| | AQ | 1.0 | | 0.048 | | |
| 30 | AA | 1.0 | 7.0 | 0.048 | 15.1 | |
| | AM | 1.0 | | 0.048 | | |
| 31 | AA | 1.0 | 7.0 | 0.048 | 16.2 | |
| | AO | 1.0 | | 0.048 | | |
| 32 | AA | 1.0 | 7.0 | 0.048 | 12.8 | Sample freshly prepared |

TABLE III-continued

Western Location Manufacturer's Cement Lab Test Results

| Test No. | Product | Solution Conc (%) | Feedrate mLs/350 g | Feedrate Gal/Ton | % Air | Comments |
|---|---|---|---|---|---|---|
|  | AF | 1.0 |  | 0.048 |  |  |

NOTES:
1. Tests 2-32 conducted using the same bag of Portland I/II cement.
2. Invalid tests are based on the flow properties of the cement mortar, which must be between 80-95% flow according to ASTM C185 in order for the % Air value to be valid.
3. In test 15 and 16, 50% caustic (NaOH) was added to the mixture (products) in order to solubilize the organic component (oleic acid → sodium oleate).
4. In tests where blends (2) of products were evaluated, the products were mixed and applied as one solution, e.g., in test #13, 7 mL of a solution containing 1% AA + 1% AF was added yielding a feedrate of 0.048 gal/ton of each component.
5. Except for test #26, all blends of products were prepared freshly prior to testing. Therefore, test #26 may be invalid, or considered not representative for comparison with the other data.

TABLE IV

Laboratory Foam Studies

| Test No. | Treatment(s) | Feedrate (%) | Foam Volume (cc) D.I. H₂O | Foam Volume (cc) 1000 ppm Ca++ |
|---|---|---|---|---|
| 1 | AD | 1.00 | 75 | 15 |
| 2 | AA | 1.00 | 70 | 35 |
| 3 | AK | 1.00 | 80 | 10 |
| 4 | AS | 1.00 | 80 | 5 |
| 5 | Equex S | 0.75 | 55 | 0 |
| 6 | Bioterge AS-40 | 0.25 | 50 | 20 |
| 7 | Biosoft D-40 | 0.25 | 50 | 15 |
| 8 | Steol KS-460 | 0.25 | 45 | 25 |
| 9 | Alkamide CDO | 0.25 | 50 | 50 |
| 10 | Emersol 210* | 0.50 | 50 | 0 |

*50% Caustic (NaOH) added to make the sodium salt (oleic acid → Na oleate)

KEY 1 (For Tables I-IV)
Cement Clinker Dust Control Testing Product Formulations 1. AA: 15% Bioterge AS-40, 9.0% Steol KS-460
2. AB: 30.0% Lignosol XD, 1.0% PF3, 1.0% Surfonic N-95
3. AC: 70.0% Ethylene Glycol, 1.0% Aerosol GPG
4. AD: 23.0% Biosoft D-40, 4.0% Bioterge AS-40
5. AE: 40.0% Astrowet O-75, 15.0% Hexylene Glycol, 5% Butyl Cellosolve
6. AF: 100% Tufflo 105
7. AG: 99% Shellflex 3311, 1% Paratac
8. AH: 30.0% Pluracol W5100
9. AI: 100.0% SAG-10
10. AJ: 12.0% Alfol 20+ Alcohol
11. AK: 20.0% Equex S, 5% Alkamide CDO
12. AL: 100% Mentor 28
13. AM: 100% Shellflex 3311
14. AN: 100% Shellflex 3681
15. AO: 100% Hydrolene 90
16. AP: 100% Witco 2013-20
17. AQ: 100% Telura 323
18. AR: 100% Emersol 210
19. AS: 21.9% Biosoft D-40, 5.0% Emersol 210, 3.8% Bioterge AS-40

NOTE: Minor constituents (<1%) not included in the above formulations.

KEY 2 (Used With Key 1)
Cement Clinker Dust Control Testing Raw Material Specifications

| Trade Name | Manufacturer | % Actives | Description |
|---|---|---|---|
| Bioterge AS-40 | Stepan Co. | 40 | Sodium alpha olefin sulfonate |
| Steol KS-460 | Stepan Co. | 60 | Sodium alkyl ether sulfate |
| Lignosol XD | Reed Lignin | 100 | Sodium lignosulfonate |
| PF 3 | Betz Laboratories | 3 | Acrylamide copolymer |
| Surfonic N-95 | Texaco Chemical Co. | 100 | Nonylphenoxy polyethoxy ethanol |
| Aerosol GPG | American Cyanamid | 70 | Sodium dioctyl sulfosuccinate |
| Biosoft D-40 | Stepan Co. | 40 | Sodium alkyl aryl sulfonate |
| Astrowet O-75 | Alco Chemical Corp. | 75 | Sodium dioctyl sulfosuccinate |
| Pluracol W5100 | BASF Wyandotte | 100 | Polyalkylene glycol |
| SAG-10 | Union Carbide | 10 | Silicon emulsion |
| Alfol 20+ Alcohol | Vista (Conoco) | 74 | Fatty alcohol |
| Equex S | Proctor & Gamble | 30 | Sodium lauryl sulfate |
| Alkamide CDO | Alkaril Chemicals | 100 | Coconut diethanolamide |
| Emersol 210 | Emery Chemicals | 100 | Oleic acid |
| Paratac | Exxon Chemicals | ? | Polyisobutylene, high molecular weight |
| Mentor 28 | Exxon | 100 | Paraffinic process oil, 50 SSU @ 100° F. |
| Tufflo 105 | Arco | 100 | Naphthenic process oil, 108 SSU @ 100° F. |
| Telura 323 | Exxon | 100 | Naphthenic process oil, 108 SSU @ 100° F. |
| Witco 2013-20 | Witco, Golden Bear | 100 | Naphthenic process oil, 107 SSU @ 100° F. |
| Shellflex 3311 | Shell | 100 | Naphthenic process oil, 275 SSU @ 100° F. |
| Shellflex 3681 | Shell | 100 | Naphthenic process oil, 800 SSU @ 100° F. |
| Hydrolene 90 | Sunoco | 100 | Aromatic process oil, 3500 SSU @ 100° F. |

DISCUSSION—Tables I-IV

In Table I, a number of foaming agent formulations were applied as foam to hot (200°-400° F.) cement clinker, downstream of the clinker cooler, at a Western cement plant. The data show product and total foaming solution feedrates, foam generator back pressure (higher pressures generally indicate higher expansion foams), % dust suppression (visual estimate) and % air (ASTM C185).

Of particular importance are Tests No. 5-8, which show that dust suppressing amounts of a traditional foaming agent formulation significantly increase the air content of cement mortar prepared from foam treated clinker according to ASTM specifications. At lower foaming agent feedrates, % air values decrease, but % dust suppression also decreases to marginal levels.

Also of importance are Tests No. 8 and 9, in which a dust control treatment was applied as a spray (wet suppressant) to the drag chain used to convey the clinker. These data show that a traditional wet suppression treatment approach provides only marginal dust control (50%), with deleterious effects on the air content of treated clinker mortar and material handling properties (drag chain pluggage).

Of primary interest is Test No. 15, in which a low salt tolerant foaming agent formulation was evaluated (Product AD). Compared to Test No. 6 (Product AA), the low salt tolerant foaming agent had significantly less of an effect on the air content of treated clinker mortar, and superior dust control efficacy.

The results of preliminary laboratory testing conducted to confirm and/or predict the effects of foaming agent formulations on the air content of cement mortar are shown in Table II. Treatments were added to the water used in preparing cement mortar according to ASTM C305. In general, these data correlate with comparative field data (Table I). Of possible concern is the fact that the effects of the low salt tolerant foaming agent (AD) compared to the traditional foaming agent (AA) on air content are subtle, whereas the field data are more definitive and conclusive. Based on these data, further laboratory testing was warranted (Table III).

Table III summarizes the results of a second laboratory study conducted to determine the effects of foaming agent formulations on the air content of cement mortar. As indicated, a single bag of Portland I/II cement was used for Tests No. 2-32 to ensure consistent physical and chemical properties of the cement mortar. All testing was performed according to ASTM specifications, using ASTM approved equipment, mortar constituents and methodology.

Of primary interest in Table III are Tests No. 6, and 8-10, in which foaming agent formulations with varying degrees of salt (calcium) tolerance were evaluated. As will be discussed later (Table IV), the degree of salt tolerance exhibited by the formulations tested in the aforementioned test series follows AA>AD>AK>AS (i.e,. the foaming properties of AA are least affected by the presence of inorganic salts), which follows exactly the order of increased air induced by the addition of foaming agent to the cement mortar. Therefore, these data clearly demonstrate the relationship between the affinity of a surfactant(s) to react or precipitate with inorganic salts and the effects of said surfactant(s) on air entrainment values in cement mortar. Accordingly, in consideration of the field data presented in Table I, these data suggest that formulations AD, AK and AS would be suitable low calcium tolerant foaming agents for use under the preferred embodiment of this invention.

Also of interest are the data in Table IV, which illustrate the effects of water hardness ($Ca^{++}$) on the foaming properties of a number of surfactants and foaming agent formulations. In particular, in Tests No. 1-4, the data show the relative salt (calcium) tolerance of the foaming agents discussed previously regarding the effects of salt tolerance on foaming agent related air entrainment in cement mortar (Table III, Tests No. 6 and 8-10). Based on the field data in Table I and laboratory data in Table III, it appears that the test methodology used for the laboratory foam studies is appropriate for providing an empirical definition of acceptable low salt tolerant foaming agents for cement clinker dust control; i.e., a foaming agent formulation evaluated according to the test method employed in Table IV, which foam volume is reduced by at least 80% (using formulation AD as an acceptable standard) would be considered a "low salt tolerant" foaming agent in accordance with this invention.

Of final interest in Table IV are Tests No. 5-10, which show the relative salt (calcium) tolerance of several individual surfactant materials. These data indicate that particularly suitable surfactants for cement clinker dust control are Equex S (sodium lauryl sulfate) and caustic neutralized Emersol 210 (sodium oleate). The fact that the Biosoft D-40 component of formulation AD is most affected by the presence of $Ca^{++}$ suggests that it is the more preferable component of said formulation, which supports its presence as a major constituent.

At present, it is preferred to use product "AD" as the low salt tolerant surfactant containing formulation.

Dosage ranges for the product are:

| Dosage Range | Total Foaming Solution Gal/Ton of Clinker | % Product AD in Foaming Sol'n | Gal Product AD/ Ton of Clinker |
|---|---|---|---|
| Exemplary | 1.0–10.0 | 0.50–5.00 | 0.005–0.500 |
| Preferred | 2.5–5.0 | 1.00–2.00 | 0.025–0.100 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of suppressing dust generation emanating from calcined cement clinker comprising:
   foaming a solution comprising water and a low salt tolerant surfactant foaming agent, applying said foam solution to said cement clinker, grinding said clinker with gypsum to form cement, and slurrying said cement with water and inhibiting foam formation in said slurried cement by interaction of said low salt tolerant surfactant and dissolved salts in said slurried cement so as not to result in a significant increase in air entrapment in the final cement product.

2. Method as defined in claim 1 further comprising, before said foaming step, diluting said solution with water having a hardness of from 0 to 250 ppm (as $CaCO_3$).

3. Method as defined in claim 2 wherein said low salt tolerant surfactant is an anionic surfactant.

4. Method as defined in claim 3 wherein said surfactant is sodium dodecylbenzene sulfonate.

5. Method as defined in claim 3 wherein said surfactant is sodium lauryl sulfate.

6. Method as defined in claim 3 wherein said surfactant is a sodium alpha olefin sulfonate.

7. Method as defined in claim 2 wherein said solution, before dilution comprises
   10–50 wt % low salt tolerant anionic surfactant
   remainder water.

8. Method as defined in claim 7 wherein said, before dilution, solution comprises
15–23 wt % sodium dodecylbenzene sulfonate
2–5 wt % sodium $C_{14}$–$C_{16}$ olefin sulfonate
remainder water.

9. Method as defined in claim 3 wherein said surfactant is the sodium salt of a fatty acid.

10. Method as defined in claim 3 wherein said anionic surfactant is used in combination with a nonionic surfactant to improve the dust control properties of said foam.

11. Method as defined in claim 7 wherein said solution is diluted in said water at a dilution ratio of from about 99:1 to about 95:5, water to solution.

12. Method of claim 8 wherein said solution is diluted in said water at a dilution ratio of from about 99:1 to about 95:5, water to solution.

13. A method of suppressing dust generation emanating from calcined cement clinker comprising selecting a low salt tolerant surfactant such that upon forming a cement product by slurrying, foam formation is inhibited in said slurried cement product so as not to result in a significant increase in air entrapment in the final cement product, and applying a foamed solution comprising water and said low salt tolerant surfactant foaming agent to said cement clinker.

14. Method of claim 13 wherein said low salt tolerant surfactant is selected so that increased air entrapment due to said foam formation in said cement product is not increased by not more than about 20% compared to air entrapment in untreated clinker.

15. Method of claim 13 wherein said low salt tolerant surfactant is an anionic surfactant.

16. Method of claim 15 wherein said low salt tolerant surfactant is the sodium salt of a fatty acid.

17. Method of claim 15 wherein said surfactant is sodium dodecylbenzene sulfonate.

18. Method of claim 15 wherein said surfactant is sodium lauryl sulfate.

19. Method of claim 15 wherein said surfactant is sodium alpha olefin sulfonate.

20. A method of suppressing dust generation emanating from calcined cement clinker comprising:
foaming a solution consisting essentially of water and low salt tolerant salts of fatty acids surfactant foaming agent, applying said foam solution to said cement clinker, grinding said clinker with gypsum to form cement, and slurrying said cement with water and inhibiting foam formation in said slurried cement by interaction of said low salt tolerant surfactant and dissolved salts in said slurried cement so as to not result in a significant increase in air entrapment in the final cement product.

* * * * *